Nov. 3, 1925.   1,560,359
J. Q. TILTON
POTATO DIGGER
Original Filed Feb. 20, 1924
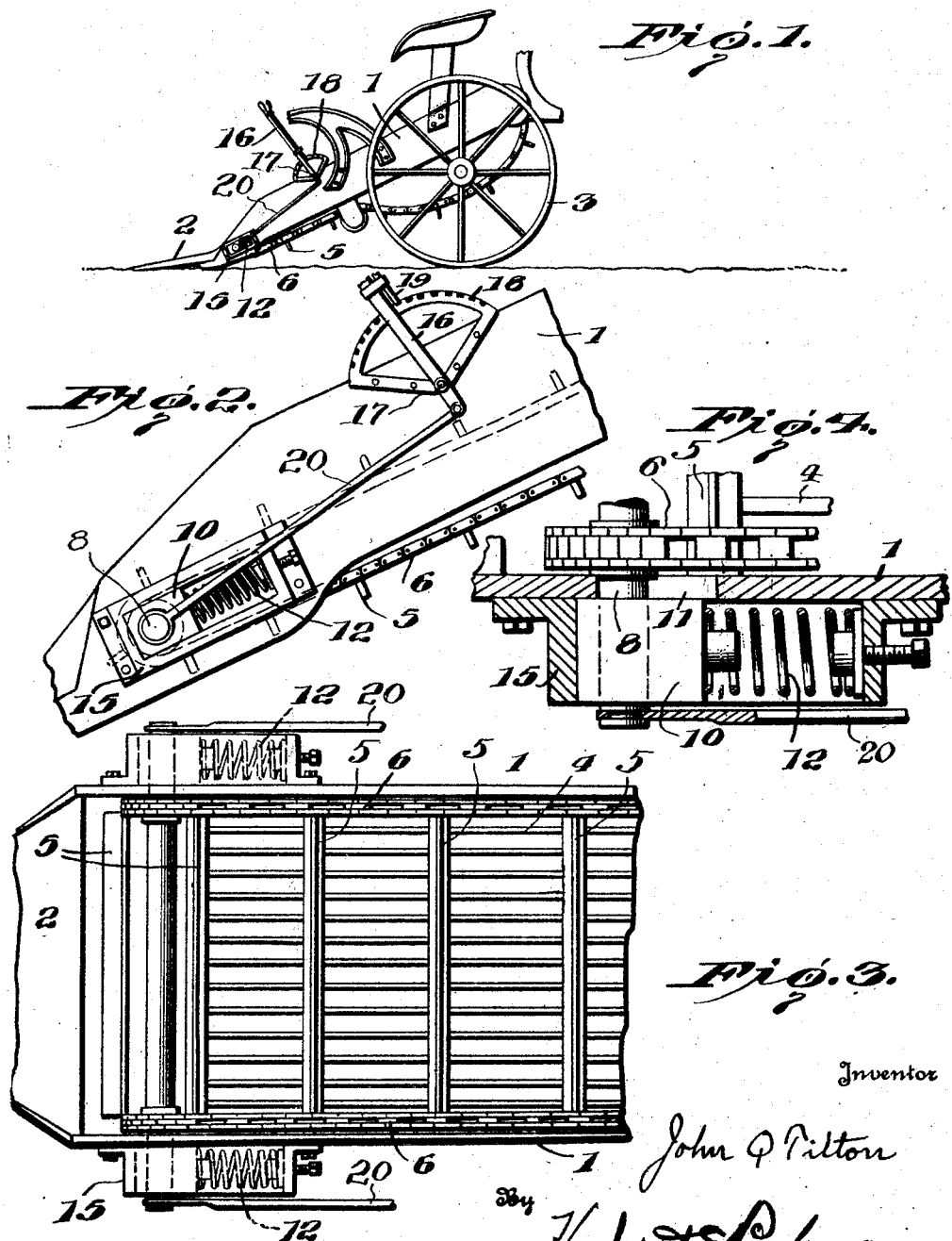
Inventor
John Q Tilton
By
Hubert Peck   Attorney Patented Nov. 3, 1925.

1,560,359

UNITED STATES PATENT OFFICE.

JOHN Q. TILTON, OF MATTAWAMKEAG, MAINE.

POTATO DIGGER.

Application filed February 20, 1924, Serial No. 694,039. Renewed August 29, 1925.

*To all whom it may concern:*

Be it known that I, JOHN Q. TILTON, a citizen of the United States of America, and a resident of Mattawamkeag, county of Penobscot, State of Maine, have invented certain new and useful Improvements in and Relating to Potato Diggers, of which the following is a specification.

This invention relates to certain improvements in potato diggers; and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope thereof.

My invention relates particularly to potato diggers of that type wherein an endless traveling conveyer receives the potatoes and dirt from the scoop or shovel and conveys the same upwardly and rearwardly and delivers the load to a suitable separator. In machines of this type, as now generally constructed, difficulty is often caused by stones or lumps of hard material wedging between the conveyer and adjacent parts at the front portions of the machine and thereby causing the conveyer to jam, requiring the operator to stop the progress of the machine until the obstruction can be removed so that the conveyer can operate and the machine can continue its work.

It is an object of the invention to provide yielding supporting and controlling means for the front or receiving portion of the conveyer so arranged and constructed as to permit the conveyer to automatically yield or give when a stone or obstruction tends to wedge or jam the same, and thereby continue to operate or travel past the obstruction and to relieve itself of such obstruction without stopping the progress of the machine.

With these and other objects in view my invention consists in certain novel features of construction and in combinations and arrangements as more fully and particularly set forth and specified hereinafter.

Referring to the accompanying drawings:

Fig. 1 is a side elevation showing in part and somewhat diagrammatically a potato digger embodying my invention.

Fig. 2 is a detail side elevation, the outer side of the boxing being removed to show the spring and slide block therein.

Fig. 3 is a detail top plan view.

Fig. 4 is a detail section.

In the drawings, I show tthe parallel frame sides 1 to the front ends of which the forwardly projecting scoop or shovel 2 is fixed. The rear portion of the frame is mounted on a suitable axle that is carried on the main supporting or bull wheels 3. The frame sides 1 are rigidly secured together by suitable cross bars that support slats parallel with the frame sides to form the usual upwardly and rearwardly inclined separating floor 4 on which the potatoes and dirt are propelled by the cross slats 5 of any suitable endless conveyer and through which the dirt falls. The slats 5 are secured at their ends to a pair of endless traveling chains 6 to form the conveyer traveling upwardly above the floor 4 and returning below the floor. The conveyer is propelled by sprocket wheels on any suitable drive shaft (not shown) suitably geared to and driven from the bull wheels as usual. The floor 4 at its lower end, terminates a short distance in rear of the rear edge of the shovel. The idler roller or shaft 8 for the lower end of the conveyer extends transversely between the frame sides and is located in the space between the lower end of said floor 4 and the rear edge of the shovel, so that as the machine progresses the dirt, stones, vines and potatoes pass upwardly and rearwardly from the shovel and are propelled upwardly on said floor by the conveyer. The conveyer delivers the load from the upper end of the floor, to any suitable separator which separates the potatoes from the dirt and vines, in any suitable or usual manner.

In the machines of this type, as generally constructed the idler or front roller or shaft 8, is usually mounted in fixed bearings, i. e., the position of the roller with respect to the rear edge of the shovel is fixed. Consequently when the machine operates in soil containing stones or hard lumps, the conveyer is liable to be locked by reason of stones or hard lumps becoming wedged or jammed in narrow spaces between various parts with consequent breakage of conveyer slats and chains and even where breakage does not result, the machine must be stopped to permit removal of the obstructing stone. The stones are liable to jam and wedge between the idler roller and the shovel, between the slats and roller and between the slats and floor, and lock the conveyer. To avoid this difficulty, I provide yielding bearings for the idler roller 8 to permit said roller to give or move rearwardly under excessive pressure thereby affording relief to the roller or to the conveyer and permitting passage of the obstruction or continued forward movement of the conveyor, and also to permit loosening of the conveyer to permit repair thereof and replacement of chain links.

In the particular example illustrated, the front roller or shaft 8 is mounted to rotate in and is carried by end slide blocks, journal boxes or slides 10 preferably arranged at the outer faces of the frame sides 1, in housings or boxings 15 fixed thereto. Each frame side 1 is formed with a longitudinal slot 11 through which roller 8 extends, and the housings 15 provide longitudinal slideways for the blocks 10 in which said blocks are slidable longitudinally of said slots 11 to carry the roller 8 toward and from the rear end of the shovel. These slides or blocks 10 are backed by suitable springs, such as coiled springs 12, located in housings 15 and of sufficient power to yieldingly and normally maintain said slide blocks 10 at their limits of forward movement at the closed front ends of the slots 11 with the idler roller 8 at its limit of movement toward the shovel and in its normal position for the normal operation of the conveyer. The power of these springs is sufficient to hold the idler roller forward to its normal position against the pull and drag of the conveyer in normal operation. However, should a stone or other sufficiently hard material tend to wedge or jam the roller or conveyer, the excessive pressure resulting instead of locking the conveyer or resulting in breakage, will cause the springs to yield and the roller to move rearwardly for the passage of the stone or to loosen the conveyer until it slips past the obstruction. The conveyer is thus enabled to automatically free itself from obstructions as the machine progresses in work.

The boxes 15 can be closed in any suitable manner to reduce to the minimum entrance of dirt, and said boxes carry the springs 12 and slide blocks 10, and provide abutments for the rear ends of the springs while the front ends of the springs preferably abut the rear ends of the slide blocks. The boxes 15 preferably also form or provide front stops or abutments against which blocks 10 are normally held by springs 12, and if so desired any suitable means can be provided for varying or adjusting the tension of the springs 12 on the slide blocks 10.

I also provide manually operated mechanism for controlling the positions of the blocks or boxes carrying the front roller 8 independently of the backing springs, so that the roller can be held forward to its normal position in the event that one or both of the springs become broken or inoperative, and so that the roller can be held back from normal position and against the power of the springs to loosen the conveyer for repair purposes or for other reasons.

In the example illustrated, for this purpose, I show upright hand levers 16 arranged at the outer side faces of the frame sides. Each lever is pivotally joined to its frame side to swing on horizontal fulcrum 17. A fixed toothed sector 18 is provided for each lever. Each lever is equipped with a spring actuated locking dog 19 controlled by a hand clip whereby the dog engaging the toothed sector can hold the lever in any desired position in its range of movement. The lower end of each lever is pivotally connected by push and pull rod 20 with the adjacent slide block or with the adjacent end of the idler roll.

The hand levers 16, are thus connected through links 20 with the ends of the idler shaft 8, respectively, so that either hand lever 16 can force its end of the idler shaft (through its link 20 and block 10) forwardly or draw the same rearwardly. If a spring 12 break the hand lever 16 on that side of the machine, can be swung to force block 10 forwardly to normal position and thus hold the same by the locking action of dog 19 engaging toothed sector 18. Likewise, either or both hand levers can be swung to draw either or both blocks 10 rearwardly, compressing spring or springs 12, thereby loosening the conveyer for repair or other purposes.

Under normal conditions, the hand levers are rendered free to swing (as the blocks 10, slide back and forth with the idler shaft 8) in any suitable manner or by any suitable means. For instance, the dogs 19, are normally tilted up or back from operative engagement with their toothed sectors 18. The dogs might be thus held in inoperative position by holding the hand clips controlling the dogs, in compressed position by ties or the dogs can be held in inoperative position by hooks or ties.

However, I do not wish to limit myself to any particular arrangements or constructions of coupling the hand levers to the idler shaft ends, nor to the provision of hand levers for moving and holding the blocks under abnormal conditions.

It is evident that various changes, modifications and variations might be resorted to without departing from the spirit and scope of my invention and hence I do not wish to limit myself to the exact disclosures hereof.

What I claim is:

1. A potato digger embodying a shovel and an endless driven traveling conveyer arranged to receive the load from the shovel, and a spring-held rearwardly yieldable front idler shaft or roller for said conveyer combined with normally inactive means whereby said roller can be held against rearward movement.

2. In combination in a potato digger, a shovel, an endless driven traveling conveyer arranged to receive the load from the shovel, a rearwardly yieldable front idler roller for said conveyer, expansion coil springs acting on said roller to normally maintain the same in normal position at its limit of forward movement, and means for holding said roller in a set fore and aft position independently of said springs.

3. A potato digger comprising a shovel, an endless driven traveling conveyer arranged to receive the load from the shovel, a front idler roller for said conveyer, spring pressed blocks in which said roller is mounted, said blocks being slidable rearwardly to loosen the conveyer and yieldingly held forward in normal position, and means independent of such springs for holding either block against rearward sliding.

4. A potato digger comprising a shovel, an endless driven traveling conveyer arranged to receive the load from the shovel, a spring held rearwardly yieldable front idler roller for said conveyer, hand levers operatively connected to said roller for determining the position of said roller independently of said springs, and normally inactive locking means for said levers, respectively.

5. A potato digger having frame sides, a shovel, a driven endless traveling conveyer between said sides to receive and carry off the material from the shovel, a floor extending upwardly and rearwardly from said shovel, said conveyer comprising chains and spaced cross slats, said slats arranged to travel upwardly on said floor, a front idler shaft for said conveyer, arranged between the shovel and floor, slide blocks carrying said shaft, and springs backing said blocks and normally maintaining the same at their limits of forward movement and the conveyer in normal operative adjustment, said springs arranged to yield on excessive pressure of the conveyer on the roller under the wedging action of stones and the like between slats and the floor to permit automatic clearance and progress of the conveyer.

6. A potato digger having frame sides, a front shovel, a driven endless conveyer in rear of said shovel and between said sides, a front idler shaft for said conveyer, slide blocks carrying said shaft, springs pressing said blocks forwardly, and hand levers to force said blocks forwardly or to pull the same rearwardly under abnormal conditions, and normally inactive means for locking either block, said levers being coupled to said blocks to be normally swung thereby as the blocks reciprocate.

7. A potato digger having frame sides, a front shovel, an endless conveyer leading rearwardly from said shovel, a transverse front idler shaft for said conveyer, slide blocks carrying said shaft, springs to press said blocks forwardly, normally inoperative means for holding either or both of said blocks against sliding movement independently of said springs, and boxes carrying said blocks and springs and secured to said frame sides.

JOHN Q. TILTON.